United States Patent [19]

White et al.

[11] Patent Number: 5,261,694

[45] Date of Patent: Nov. 16, 1993

[54] RECONFIGURABLE AIR BAG FIRING CIRCUIT

[75] Inventors: Craig W. White, Grosse Pointe; Kevin E. Musser, Farmington; James R. Paye, Roseville, all of Mich.

[73] Assignee: Automotive Systems Laboratory, Inc., Farmington Hills, Mich.

[21] Appl. No.: 715,344

[22] Filed: Jun. 14, 1991

[51] Int. Cl.$^5$ .............................. B60R 21/16
[52] U.S. Cl. ............................. 280/735; 307/10.1
[58] Field of Search ................ 280/735; 180/274, 282; 307/10.1; 340/436, 438

[56] References Cited

U.S. PATENT DOCUMENTS

| | | | |
|---|---|---|---|
| 4,851,705 | 7/1989 | Musser et al. | 280/735 |
| 4,958,851 | 9/1990 | Behr et al. | 280/735 |
| 5,060,504 | 10/1991 | White | 73/1 D |
| 5,085,464 | 2/1992 | Behr et al. | 340/436 |

Primary Examiner—Karin L. Tyson
Attorney, Agent, or Firm—Lyon & Delevie

[57] ABSTRACT

An air bag firing circuit comprises a firing path which includes in series a safing sensor, a squib, and a FET operated under microprocessor control in response to the output of an electronic crash sensor. A power supply maintains a known voltage across the firing path sufficient to explode the squib upon simultaneous "closure" of both the safing sensor and the FET operated by the microprocessor in response to crash sensor output. Normally, upon detection of a failure in the electronic crash sensor, its supporting electronics, or the FET actuated in response thereto, the microprocessor reconfigures the firing threshold of the safing sensor, as by applying a current to its integral test coil to increasingly bias the sensor's inertial mass away from its switch contacts. However, if a failure of the safing sensor is detected, reconfiguration of its threshold is inhibited notwithstanding the failure of other circuit components to prevent inadvertent deployment of the air bag. Once the safing sensor is reconfigured, the microprocessor turns on another FET to pull one side of the squib to ground, thereby removing the inoperable FET from the firing path and ensuring continued protection of the vehicle passengers until the sensor is serviced or replaced.

5 Claims, 1 Drawing Sheet

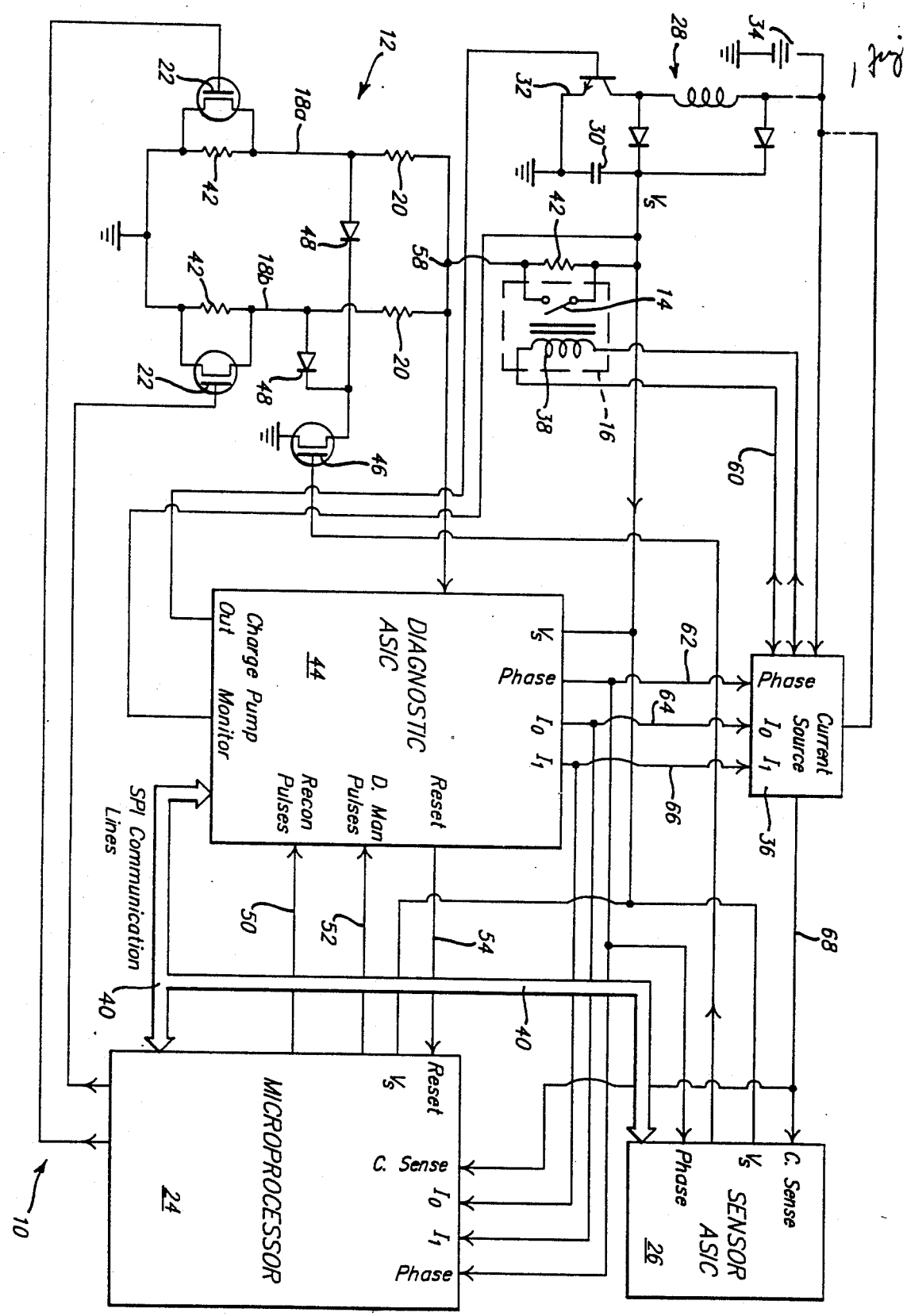

RECONFIGURABLE AIR BAG FIRING CIRCUIT

BACKGROUND OF THE INVENTION

The instant invention relates to control circuits for vehicle passenger safety restraints, such as air bags, comprising a firing path which includes two acceleration sensors whose acceleration-responsive switches are connected in series with an explosive squib.

Known air bag passenger restraint systems employ a control circuit wherein a power supply applies a voltage across a firing path which includes in series an explosive squib and two acceleration sensors having normally-open acceleration-responsive switches therein. The switch of each sensor is shunted by a resistor having a nominal resistance substantially greater than the internal resistance of the squib. Thus, a small current nominally flows through the firing path while the switches of the sensors remain in their normally-open positions. The closure of the sensors's switches in response to a collision or marked vehicle deceleration causes a significant rise in the current flowing through the squib, thereby "firing" the squib and triggering deployment of the air bag. See, e.g., U.S. Pat. No. 4,695,075, issued Sep. 22, 1987 to Kamiji et al.

Under the prior art, if the switch of either sensor fails in its closed position, or with a propensity to close, the prior art teaches the disabling of the entire control circuit to prevent the unintentional or premature triggering of the passenger restraint, once again placing the passengers at risk. See, e.g., U.S. Pat. No. 3,889,232, issued Jun. 10, 1975 to Bell, wherein the control circuit shuts down when one sensor closes without the corresponding closing of the other sensor.

Alternatively, in our U.S. Pat. No. 4,958,851 issued Sep. 25, 1990, we teach a reconfigurable air bag firing circuit whose firing path comprises two acceleration sensors connected in series with an explosive squib. The firing circuit further includes means for functionally removing the malfunctioning sensor from the firing path by closing or shunting the malfunctioning sensor, thereby providing continued protection of the vehicle passengers under the control of the remaining, still-operable sensor.

The instant invention is directed to an improved reconfigurable air bag firing circuit and an improved method of operating same.

SUMMARY OF THE INVENTION

It is an object of the instant invention to provide an improved control circuit for vehicle passenger safety restraints which includes two sensors whose acceleration-responsive switches are connected in series in the firing path thereof, and featuring continuing circuit viability notwithstanding the malfunction, or "failure," of the crash-discriminating sensor.

A further object of the instant invention is to provide an improved method of operating such a control circuit to provide increased reliability notwithstanding a single-point failure therein.

The improved control circuit for a vehicle passenger safety restraint of the instant invention comprises a low-threshold acceleration sensor, or "safing sensor," whose acceleration-responsive switch is connected in series with an explosive squib and a FET, with the FET closing under microprocessor control in response to the output of an electronic sensor employing a relatively-higher threshold. Upon the detection of a failure of the crash-discriminating electronic acceleration sensor and/or its supporting electronics, and after confirmation of continuing safing sensor functionality, the circuit reconfigures the firing circuit by raising the acceleration threshold of the safing sensor and then, after a suitable delay, removing the FET from the firing path by pulling down the side of the squib opposite the safing sensor to ground. In the preferred embodiment of the invention, the safing sensor is tested, and its threshold alternatively raised, by passing a current from a constant current source through a test coil integral to the sensor, as controlled by an application specific integrated circuit.

BRIEF DESCRIPTION OF THE DRAWING

The accompanying drawing is a schematic block diagram of an exemplary air bag firing circuit according to the instant invention.

DETAILED DESCRIPTION OF THE PREFERRED EMBODIMENT OF THE INVENTION

Referring to the drawing, an exemplary air bag firing circuit 10 according to the instant invention comprises a firing path 12 which includes, in series, the normally-open, relatively-low-threshold acceleration-responsive switch 14 of an acceleration sensor (hereinafter "safing sensor 16"); and parallel firing path legs 18a and 18b each having in series an explosive squib 20 for triggering deployment of a driver's-side and a passenger's-side air bag, respectively (both not shown), and a FET ("firing FET 22") for pulling down the side of each squib 20 opposite the safing sensor 16 to ground when operated by a microprocessor 24. The microprocessor 24 is itself responsive to the output of an electronic crash sensor integrated within an Application Specific Integrated Circuit ("Sensor ASIC 26"), as more fully described below.

A power supply 28 applies a known supply voltage $V_s$ across the firing path 12 sufficient to explode each squib 20 upon the simultaneous closure of the safing sensor's switch 14 and the firing FET 22 connected to the squib 20. The power supply 28 includes a capacitor 30 and charge pump 32 to maintain the applied voltage $V_s$ if the battery 34 connected thereto malfunctions or is otherwise isolated therefrom during a vehicle collision.

The safing sensor 16 is itself schematically represented in the drawing as a normally-open acceleration-responsive switch 14 which may be closed irrespective of acceleration upon the passage of a current from a constant current source 36 through an integral test coil 38. And, by passing the current through the test coil 38 in the opposite direction, the nominal bias on the acceleration-responsive switch 14 may be increased, whereby a higher level of sensed acceleration is required to close the switch 14 and fire the squibs 20. A constructed embodiment of the safing sensor 16 is taught in U.S. Pat. No. 4,827,091 issued May 2, 1989, to Behr, the teachings of which are hereby incorporated herein by reference.

Similarly, a constructed embodiment of the crash sensor integrated into the Sensor ASIC 26 is disclosed in our co-pending U.S. patent application Ser. No. 07/413,318 filed Sep. 27, 1989, now U.S. Pat. No. 5,060,504 issued Oct. 29, 1991, and entitled "Self-Calibrating Accelerometer," which teaching is also hereby incorporated herein by reference. Simply stated, the electronic sensor within the Sensor ASIC 26 provides an analog output proportional to vehicle acceleration, as through the incorporation of a piezoresistive element in the support beam of the sensor's micromachined cantilevered inertial mass. After analog-to-digital conversion of the electronic sensor's output within the Sensor ASIC 26, the resulting acceleration data is communicated to the microprocessor 24 via a Serial Peripheral Interface ("SPI 40"), whereupon the microprocessor 24 determines whether a threshold acceleration has been exceeded, thereby indicating a crash condition. If a crash condition is indicated, the microprocessor 24 turns on the firing FETs 22 to pull down the side of each squib 20 opposite the safing sensor 16 to ground.

The normally-open switch 14 of the safing sensor 16 and each firing FET 22 are shunted by a resistor 42 of like nominal resistance. Preferably, the nominal resistance of the shunting resistors 42 is several orders of magnitude larger than the nominal internal resistance of each of the squibs 20. In normal operation, the shunting resistors 42 maintain a relatively-low current flow through the firing path 12 and, hence, through the squibs 20 thereof. Upon the simultaneous closure of the safing sensor 16 and the firing FETs 22 in response to an acceleration exceeding the respective thresholds of the safing sensor 16 and the electronic crash sensor within the ASIC 26 (as determined by the microprocessor 24), the shunting resistors 42 are shorted and the current flowing through each squib 20 increases to a value above the firing threshold thereof to explode same and trigger deployment of each air bag.

The instant circuit 10 further comprises an Application Specific Integrated Circuit ("Diagnostic ASIC 44") for diagnosing a failure of the Sensor ASIC 26 to properly respond to acceleration, as through interpretation of Sensor ASIC data communicated thereto via the SPI 40. An exemplary method for testing the integrity of the firing path of an air bag firing circuit is taught in U.S. Pat. No. 4,851,705 issued Jul. 25, 1989, to Musser et al, the teachings of which are hereby incorporated herein by reference.

An additional FET ("reconfiguration FET 46") is connected to the firing path 12 at points on each leg 18a and 18b between the squib 20 and the firing FET 22 thereon via a diode 48, with the reconfiguration FET 46 being controlled by the Sensor ASIC 26. The reconfiguration FET 46 allows the Sensor ASIC 26 to pull the side of each squib 20 opposite the safing sensor 16 to ground when the Diagnostic ASIC 44 detects a failure of the Sensor ASIC's integral electronic crash sensor or its supporting electronics, including failures of the microprocessor 24 or the FETs 22 controlled by the microprocessor 24.

Under the instant invention, reconfiguration of the circuit's firing path 12 is controlled by the two ASICs 26 and 44, the constant current source 36, and the microprocessor 24, as follows: in the circuit's normal mode of operation, the microprocessor 24 initiates firing-path reconfiguration through the use of a watchdog timer in the Diagnostic ASIC 44. Specifically, the microprocessor 24 periodically resets the timer by sending reconfiguration pulses 50 to the Diagnostic ASIC 44. If the microprocessor 24 detects a failure of the Sensor ASIC 26, e.g., the failure of its electronic crash sensor to properly respond to acceleration, or excessive electromagnetic interference ("EMI"), the microprocessor 24 stops transmitting reconfiguration pulses 50 to the Diagnostic ASIC 44, and the timer runs out to trigger reconfiguration. Similarly, the microprocessor 24 will request reconfiguration of the circuit's firing path 12 upon detecting a failure of any of the firing FETs 22 or the reconfiguration FET 46. A suitable period for the watchdog timer is believed to be about 250 msec.

The Diagnostic ASIC 44 also monitors the microprocessor 24 through a deadman timer. In normal operation, the microprocessor 24 periodically sends a deadman signal 52 to the Diagnostic ASIC 44 to confirm its continuing operability. Upon cessation of the deadman signal 52 or other detection of a failure of the microprocessor 24 over the SPI 40, the Diagnostic ASIC 44 sends a reset signal 54 to the microprocessor 24 in an attempt to return the circuit 10 to full functionality. Should the microprocessor 24 fail to respond to a reset, the above-described watchdog timer will run out, again causing the Diagnostic ASIC 44 to initiate the reconfiguration sequence, as described more fully below. Thus, the use of the watchdog timer permits the Diagnostic ASIC 44 to reconfigure the firing path 12 notwithstanding the failure of the microprocessor 24, thereby enhancing the reliability of the instant circuit 10.

The Diagnostic ASIC 44 may also conduct periodic dynamic testing of the safing sensor 16 under microprocessor control by sending appropriate signals 62, 64, and 66 through the PHASE, $I_0$, and $I_1$ terminals of the constant current source 36, which in turn directs a current 60 in a first direction through the sensor's test coil 38 while monitoring the voltage at point 58 on the firing path 12.

Once triggered, the reconfiguration sequence for the instant circuit 10 is as follows: the Diagnostic ASIC 44 first determines whether the safing sensor 16 has been shorted to ground by monitoring the voltage at a point 58 on the firing path 12 between the safing sensor 16 and both squibs 20. If continuing safing sensor functionality (and firing path integrity) is confirmed, the Diagnostic ASIC 44 will send signals 62, 64, and 66 through PHASE, $I_0$ and $I_1$ terminals of the constant current source 36, respectively, whereby the current 60 is directed in a second direction through the sensor's test coil 38 to increase its threshold by increasingly biasing its switch 14 in the open position. When the current source 36 is turned on, the current source 36 also generates current sense pulses 68 which are counted by the Sensor ASIC 26. After a suitable number of pulses 68 are counted by the Sensor ASIC 26, thereby representing a reasonable time delay to permit the reconfigured safing sensor 16 to achieve a steady-state heightened threshold, the Sensor ASIC 26 turns on the reconfiguration FET 46 to pull down the sides of the squibs 20 opposite the safing sensor 16 to ground. The firing path 12 of the instant circuit 10 is thus reconfigured, with the heightened-threshold safing sensor 16 thereafter operating as the circuit's crash-discriminating sensor.

Preferably, the Sensor ASIC 26 counts the current sense pulses 68 only when the PHASE input to the Sensor ASIC 26 is high, thereby preventing an inadvertent increase in the safing sensor's threshold upon malfunction of the current source 36.

If the monitored voltage at point 58 on the firing path 12 indicates a shorted safing sensor 16, the Diagnostic ASIC 44 terminates the reconfiguration sequence, since it otherwise might result in inadvertent deployment of the air bags if the reconfiguration FET 46 would thereafter be turned on.

Under the instant invention, there is no need to reconfigure the system upon single-point failure of either the Diagnostic ASIC 44 or the current source 36, as the instant circuit 10 will continue to operate in its normal mode through continued operation of the Sensor ASIC 26 and the microprocessor 24. And, as noted above, in the event of a failure of the Sensor ASIC 26, reconfiguration may be effected by the Diagnostic ASIC 44 and the microprocessor 24. Similarly, in the event of a failure of the microprocessor 24, reconfiguration remains possible by virtue of continued operation of the Diagnostic ASIC 44, the current source 36, and the Sensor ASIC 26.

While the preferred embodiment of the invention has been disclosed, it should be appreciated that the invention is susceptible of modification without departing from the spirit of the invention or the scope of the subjoined claims. For example, under the instant invention, the Sensor and Diagnostic ASICs 26 and 44 may be repackaged so as to place all reconfiguration control in a separate Reconfiguration ASIC which is therefore wholly independent from the components providing diagnostic capability. Such a reconfiguration ASIC would preferably incorporate $V_s$, current sense, and voltage monitoring inputs; PHASE, $I_0$, $I_1$, reconfiguration FET control, and reconfiguration pulse outputs; and SPI communication with other circuit components regarding electronic sensor output, test signal requests, and other circuit component status communication.

We claim:

1. A control circuit for a vehicle passenger restraint comprising:
    a firing path including in series: a first, normally-open, acceleration-responsive switch which closes in response to an acceleration input exceeding a first threshold, said first switch being shunted by a first shunting resistor;
    trigger means for actuating said restraint, said trigger means having internal electrical resistance substantially less than said resistance of said first shunting resistor; and
    a second and third normally-open, electrically-operated switch, said second switch being shunted by a second shunting resistor having a resistance substantially greater than the internal resistance of said trigger means;
    means for applying a voltage across said firing path;
    an electronic sensor for sensing an acceleration exceeding a second threshold, said second threshold being nominally greater than said first threshold;
    a microprocessor responsive to said electronic sensor for operating said controlling said second switch, said microprocessor closing said second switch when said electronic sensor senses an acceleration exceeding said second threshold;
    failure-detecting means for detecting a failure of first switch, said electronic sensor, said microprocessor, or said second switch;
    first means responsive to said failure-detecting means for increasingly biasing said first switch in said normally-open position; and
    second means responsive to said failure-detecting means for operating said third switch.

2. The circuit of claim 1 wherein said first means responsive to said failure-detecting means includes
    a constant current source; and
    a coil connected to said constant current source.

3. A method of operating the circuit of claim 1, said operating method including the steps of:
    detecting a failure of at least one of said group consisting of said electronic sensor, said microprocessor, and said second switch;
    confirming the continued operability of said first sensor by not detecting a failure thereof with said failure-detecting means;
    operating said first means responsive to said failure-detecting means to increasingly bias said first switch in said normally-open position after confirming the continued operability of said first sensor; and
    operating said second means responsive to said failure-detecting means to close said third switch after said first switch is increasingly biased in said normally-open position.

4. A circuit for actuating a safety restraint in a motor vehicle comprising:
    sensor means for generating a first signal representative of instantaneous vehicle acceleration;
    processor means responsive to said first signal for generating a second signal when said first signal indicates a condition requiring actuation of said safety restraint;
    a firing path having in series a first normally-open switch means which closes in response to vehicle acceleration exceeding a threshold value therefor, a current-responsive trigger means for actuating said safety restraint, and a second normally-open switch means in communication with said processor means which closes in response to generation of said second signal;
    failure detecting means for detecting a failure of said first switch means and any one or more of the group consisting of said sensor means, said processor means and said second switch means;
    threshold-adjusting means responsive to said failure detecting means for increasing the threshold value of said first switch means, wherein said threshold-adjusting means operates to increase the threshold value of said first switch means upon detection of a failure of any one of the group consisting of said sensor means, said processor means, and said second switch means, and wherein operation of said threshold-adjusting means is inhibited upon detection of a failure of said first switch means; and
    shunt means, responsive to said failure detecting means and operation of said threshold-adjusting means, for shunting said second switch means, wherein said shunt means operates to shunt said second switch means after operation of said threshold-adjusting means upon detection of a failure of any one of the group consisting of said sensor means, said processor means, and said second switch means.

5. A method for operating a control circuit for a safety restraint in a motor vehicle, said control circuit including sensor means for generating a first signal representative of instantaneous vehicle acceleration; processor means responsive to said first signal for generating a second signal when said first signal indicates a condition requiring actuation of said safety restraint; a firing path having in series a first normally-open switch means which closes in response to vehicle acceleration exceeding a threshold value therefor, a current-responsive trigger means for actuating said safety restraint, and a second normally-open switch means in communication with said processor means which closes in response to generation of said second signal; means for detecting a failure of any one or more of the group consisting of said sensor means, said processor means, said first switch means, and said second switch means; threshold-adjusting means for increasing the threshold value of said first switch means; and shunt means for shunting said second switch means, said method comprising the steps of:

detecting a failure of any one or more of the group consisting of said sensor means, said processor means, and said second switch;

confirming the continued operability of said first switch means by not detecting a failure thereof;

operating said threshold-adjusting means after confirming continued operability of said first switch means to increase the threshold value of said first switch means;

confirming the operation of said threshold-adjusting means; and operating said shunt means to shunt said second switch means only after confirming the operability of said threshold-adjusting means.

* * * * *

UNITED STATES PATENT AND TRADEMARK OFFICE
CERTIFICATE OF CORRECTION

PATENT NO. : 5,261,694
DATED : November 16, 1993
INVENTOR(S) : Craig W. White et al It is certified that error appears in the above-identified patent and that said Letters Patent is hereby corrected as shown below:

Col. 5, line 1, delete "controlling said".

Signed and Sealed this

Third Day of May, 1994

Attest:

BRUCE LEHMAN

Attesting Officer

Commissioner of Patents and Trademarks